United States Patent
Burstein et al.

(10) Patent No.: US 10,776,272 B2
(45) Date of Patent: Sep. 15, 2020

(54) CONTROL OF PERSISTENT MEMORY VIA A COMPUTER BUS

(71) Applicant: Mellanox Technologies Ltd., Yokneam (IL)

(72) Inventors: Idan Burstein, Karmiel (IL); Diego Crupnicoff, Buenos Aires (AR); Shlomo Raikin, Kibbutz Yassur (IL); Michael Kagan, Zichron Yaakov (IL)

(73) Assignee: MELLANOX TECHNOLOGIES, LTD., Yokneam (IL)

( * ) Notice: Subject to any disclaimer, the term of this patent is extended or adjusted under 35 U.S.C. 154(b) by 748 days.

(21) Appl. No.: 15/058,262

(22) Filed: Mar. 2, 2016

(65) Prior Publication Data
US 2017/0255559 A1    Sep. 7, 2017

(51) Int. Cl.
*G06F 12/0831* (2016.01)
*G06F 3/06* (2006.01)
*G06F 12/128* (2016.01)
*G06F 13/28* (2006.01)
*G06F 13/42* (2006.01)
(Continued)

(52) U.S. Cl.
CPC ........ *G06F 12/0833* (2013.01); *G06F 3/0659* (2013.01); *G06F 3/0679* (2013.01); *G06F 12/128* (2013.01); *G06F 13/28* (2013.01); *G06F 13/4282* (2013.01); *G06F 15/17331* (2013.01); *G06F 12/0804* (2013.01); *G06F 2212/1024* (2013.01); *G06F 2212/154* (2013.01); *G06F 2212/621* (2013.01)

(58) Field of Classification Search
CPC .. G06F 12/0833; G06F 3/0659; G06F 3/0679; G06F 12/128; G06F 13/4828; G06F 15/17331; G06F 2212/621; G06F 2212/69; G06F 12/0804
See application file for complete search history.

(56) References Cited

U.S. PATENT DOCUMENTS

| | | | | |
|---|---|---|---|---|
| 4,680,703 A * | 7/1987 | Kriz | ...................... | G06F 3/0601 711/112 |
| 5,913,226 A * | 6/1999 | Sato | .................... | G06F 12/0833 711/141 |

(Continued)

FOREIGN PATENT DOCUMENTS

WO    WO 2014158168 A1 * 10/2014    ......... G06F 12/0804

OTHER PUBLICATIONS

Nov. 10, 2010, PCI Express, PCI Express Base Specification 3.0, p. 76 and 616.*

(Continued)

*Primary Examiner* — Michael Krofcheck
(74) *Attorney, Agent, or Firm* — Kligler & Associates Patent Attorneys Ltd (57) ABSTRACT

A memory device includes a target memory, having a memory address space, and a volatile buffer memory, which is coupled to receive data written over a bus to the memory device for storage in specified addresses within the memory address space. A memory controller is configured to receive, via the bus, a flush instruction and, in response to the flush instruction, to immediately flush the data held in the buffer memory with specified addresses within the memory address space to the target memory.

44 Claims, 3 Drawing Sheets

(51) Int. Cl.
*G06F 15/173* (2006.01)
*G06F 12/0804* (2016.01)

(56) References Cited

U.S. PATENT DOCUMENTS

| | | | | |
|---|---|---|---|---|
| 6,490,647 | B1* | 12/2002 | Batchelor | G06F 13/4059 710/305 |
| 7,721,049 | B2* | 5/2010 | Ehrlich | G06F 12/0804 711/113 |
| 7,886,182 | B1 | 2/2011 | Coatney et al. | |
| 9,104,582 | B1* | 8/2015 | Mukundan | G06F 12/0893 |
| 9,525,734 | B2 | 12/2016 | Izenberg et al. | |
| 9,645,931 | B2* | 5/2017 | Cox | G06F 12/0831 |
| 9,645,932 | B1* | 5/2017 | Bono | G06F 12/0833 |
| 9,678,871 | B2 | 6/2017 | Voigt | |
| 10,042,750 | B2 | 8/2018 | Roberts et al. | |
| 2006/0179195 | A1 | 8/2006 | Sharma et al. | |
| 2006/0256784 | A1* | 11/2006 | Feng | H04L 67/1097 370/381 |
| 2006/0259661 | A1 | 11/2006 | Feng et al. | |
| 2008/0256183 | A1 | 10/2008 | Flynn et al. | |
| 2009/0300660 | A1 | 12/2009 | Solomon et al. | |
| 2010/0205367 | A1* | 8/2010 | Ehrlich | G06F 12/0804 711/113 |
| 2011/0153952 | A1 | 6/2011 | Dixon et al. | |
| 2013/0198311 | A1 | 8/2013 | Tamir et al. | |
| 2014/0195480 | A1 | 7/2014 | Talagala et al. | |
| 2014/0258637 | A1* | 9/2014 | Hong | G06F 12/0808 711/135 |
| 2015/0019903 | A1 | 1/2015 | Arroyo et al. | |
| 2015/0067091 | A1* | 3/2015 | Das | H04L 67/1095 709/213 |
| 2015/0347349 | A1 | 3/2015 | Raindel et al. | |
| 2016/0124877 | A1* | 5/2016 | Hefty | G06F 13/28 710/308 |
| 2016/0378709 | A1 | 6/2016 | Menachem et al. | |
| 2017/0017609 | A1 | 1/2017 | Menachem et al. | |
| 2017/0034268 | A1* | 2/2017 | Govind | H04L 67/1097 |

OTHER PUBLICATIONS

PCI Express® Base Specification, Revision 3.0, 860 pages, Nov. 10, 2010.

Nvidia Corporation, "Nvidia GPUDirect", 4 pages, year 2015.

European Application # 17156357.0 Search Report dated Jul. 6, 2017.

InfiniBand TM Architecture Specification vol. 1, Release 1.3, 1842 pages, Mar. 3, 2015.

CN Application # 201710095102X office action dated Jun. 20, 2019.

U.S. Appl. No. 15/202,590 office action dated Oct. 1, 2018.

U.S. Appl. No. 15/177,348 office action dated May 17, 2018.

* cited by examiner

CONTROL OF PERSISTENT MEMORY VIA A COMPUTER BUS

FIELD OF THE INVENTION

The present invention relates generally to computer systems and methods for their operation, and specifically to the use of persistent memory devices in a computer system.

BACKGROUND

The term "persistent memory" is used in the context of the present description and in the claims to denote any sort of semiconductor memory that both supports random-access writing and reading of data to and from the memory and retains the data when power is turned off. Examples of persistent memory that are currently in use include various types of non-volatile random-access memory (NVRAM), including flash memory, as well as battery-backed RAM devices. New types of persistent memory are in development, such as the "3D Xpoint" memory recently announced by Intel and Micron Technology.

SUMMARY

Embodiments of the present invention that are described hereinbelow provide improved techniques for interaction with persistent memory devices via a computer bus.

There is therefore provided, in accordance with an embodiment of the invention, a memory device, including a target memory, having a memory address space, and a volatile buffer memory, which is coupled to receive data written over a bus to the memory device for storage in specified addresses within the memory address space. A memory controller is configured to receive, via the bus, a flush instruction and, in response to the flush instruction, to immediately flush the data held in the buffer memory with specified addresses within the memory address space to the target memory.

In a disclosed embodiment, the target memory includes a persistent memory.

In one embodiment, the flush instruction causes the memory controller to flush to the target memory all of the data conveyed over the bus to the target memory in write commands posted previously to the flush instruction. Alternatively, the flush instruction identifies a range that is to be flushed within the memory address space, and causes the memory controller to immediately flush the data held in the buffer memory with specified addresses within the identified range to the target memory. Typically, the memory controller is configured to flush, in response to the flush instruction, the data only within the identified range, while leaving further data with specified addresses outside the identified range in the buffer memory without immediate flushing to the target memory.

In the disclosed embodiments, the memory controller is configured, after flushing the data to the target memory, to send a completion message over the bus to a sender of the flush instruction.

In one embodiment, the bus over which the data and flush instruction are written is a peripheral component bus of a computer, having a bus address space in which a range to be flushed is identified in terms of memory pages, and the memory controller is configured to translate the identified range of memory pages from the bus address space to memory blocks for flushing within the memory address space.

In some embodiments, the memory controller is configured to identify multiple regions within the memory address space and to associate respective flush attributes with the regions, wherein the flush instruction causes the memory controller to flush the data held in the buffer memory with specified addresses within any given region in accordance with the respective flush attributes. In one embodiment, the respective flush attributes indicate whether the given region corresponds to a range in the target memory that includes persistent memory.

There is also provided, in accordance with an embodiment of the invention, computing apparatus, including the memory device described above and a network interface controller (NIC), which is coupled to receive from a peer node, via a network, a remote direct memory access (RDMA) write packet containing the data to be written to the memory device and specifying the addresses to which the data are to be written, and to receive an RDMA flush packet, and which is configured, in response to the RDMA write and flush packets, to convey the data and the flush instruction over the bus to the memory device.

Typically, the data and the flush instruction are conveyed from the NIC to the memory device, and the data are flushed by the memory controller from the buffer memory to the target memory without generating an interrupt to a central processing unit (CPU) that is coupled to the bus in the apparatus.

In some embodiments, the NIC is configured to receive the RDMA write and flush packets from the peer node over a transport service instance established between the NIC and the peer node, wherein a memory region in the memory device is associated with the transport service instance, wherein the write packet causes the NIC to write the data to the associated memory region, and wherein the flush packet causes the NIC to issue the flush instruction with respect to the associated memory region. In a disclosed embodiment, the NIC is configured to associate respective flush attributes with the memory region, and the flush instruction causes the memory controller to flush the data written by the NIC to specified addresses within the memory region in accordance with the associated flush attributes.

In a disclosed embodiment, the apparatus includes a peer NIC deployed at the peer node, wherein the peer NIC is configured to transmit the RDMA write and flush packets over the network in response to RDMA write and flush work requests submitted to the peer NIC by a process running on the peer node.

There is additionally provided, in accordance with an embodiment of the invention, a memory device, including a target memory, having a memory address space, and a volatile buffer memory, which is coupled to receive data written over a bus in transaction packets to the memory device for storage in specified addresses within the memory address space, each transaction packet including a transaction descriptor, which includes a flush flag. A memory controller is configured to receive, via the bus, a flush instruction and, in response to the flush instruction, to immediately flush to the target memory the data held in the buffer memory for which the flush flag was set in the transaction packets that conveyed the data to the memory device.

In a disclosed embodiment, the memory controller is configured to flush, in response to the flush instruction, only the data for which the flush flag was set, while leaving further data that arrived in transaction packets in which the flush flag was not set in the buffer memory without immediate flushing to the target memory.

In one embodiment, the transaction descriptor includes a "No Snoop" attribute field, which includes the flush flag.

There is further provided, in accordance with an embodiment of the invention, computing apparatus, including the memory device described above and a network interface controller (NIC), which is coupled to receive, via a network, a remote direct memory access (RDMA) write packet containing the data to be written to the memory device, specifying the addresses to which the data are to be written, and indicating that the data are to be flushed to the target memory, and to receive an RDMA flush packet following the RDMA write packet, and which is configured, in response to the RDMA write packet, to convey the data over the bus to the memory device in a transaction packet in which the flush flag is set, and to convey the flush instruction to the memory device in response to the RDMA flush packet.

There is moreover provided, in accordance with an embodiment of the invention, a method for data storage in a memory device that includes a target memory and a volatile buffer memory. The method includes receiving in the volatile buffer memory data written over a bus to the memory device for storage in specified addresses within a memory address space of the memory device. A flush instruction is received via the bus. In response to the flush instruction, the data held in the buffer memory with specified addresses within the memory address space are immediately flushed to the target memory.

There is furthermore provided, in accordance with an embodiment of the invention, a method for data storage in a memory device that includes a target memory and a volatile buffer memory. The method includes receiving in the volatile buffer memory data written over a bus in transaction packets to the memory device for storage in specified addresses within a memory address space of the memory device, each transaction packet including a transaction descriptor, which includes a flush flag. A flush instruction is received via the bus. In response to the flush instruction, the data held in the buffer memory for which the flush flag was set in the transaction packets that conveyed the data to the memory device are immediately flushed to the target memory.

The present invention will be more fully understood from the following detailed description of the embodiments thereof, taken together with the drawings in which:

DETAILED DESCRIPTION OF EMBODIMENTS

Software applications that make use of persistent memory generally rely on the assumption that once data have been written to a persistent memory device, the data will actually persist. In other words, the application assumes that the write operation has been committed to the persistent memory and will remain unaffected by any subsequent power outage or other system failure.

In practice, however, this sort of assumption is not always correct, particularly when the persistent memory device is accessed by posted write operations via a bus, such a PCI Express® (PCIe®) or other peripheral component bus in a computer. Persistent memory devices often include a volatile random-access memory (RAM), which serves as a buffer to receive data written over the bus to the memory device. A memory controller in the device decides when to flush the data to the persistent memory, and may not do so immediately. Therefore, after writing data over a PCIe bus to a persistent memory device, the entity that posted the write operation generally has no assurance that the data have actually been committed from the buffer to the persistent memory.

As another example, when a peripheral device, such as a network interface controller (NIC), writes data over a bus to a persistent system memory, the data may be cached along the way in volatile memory, such as in a cache belonging to the root complex of the bus. The bus will return an acknowledgment to the device that posted the write operation immediately, and the device does not normally receive any confirmation that the data have actually been flushed from the cache to the persistent memory.

Embodiments of the present invention that are described herein address these difficulties by providing device architectures and techniques that enable an entity writing data over a bus to a persistent memory device to make sure that the data have actually been flushed to the persistent memory. These techniques can be applied both by software entities, such as application programs, and hardware entities, such as a NIC, that write and read data to and from such persistent memory devices.

When applied by a NIC, the disclosed techniques can be used to implement remote direct memory access (RDMA) operations initiated by a peer node across a network, while minimizing or eliminating entirely the need to interrupt the central processing unit (CPU) in connection with these operations. A peer NIC deployed at the peer node can be configured to transmit RDMA write and flush packets over the network in response to RDMA write and flush work requests submitted to the peer NIC by an application program running on the peer node. The NIC on the receiving side will then verify that the data have been written and actually flushed to the persistent memory before signaling to the peer NIC that the operations have been completed.

The disclosed embodiments are particularly useful in accessing and controlling persistent memory devices over a peripheral component bus, such as a PCIe bus, and thus enable more versatile, scaled-up use of persistent memory in standard computer systems. In addition, the principles of these embodiments can be applied, *mutatis mutandis*, over buses of other sorts, such as dual in-line memory module (DIMM) buses that are commonly used in communication between a central processing unit (CPU) and system memory.

Furthermore, although the disclosed embodiments relate primarily to flushing of data to persistent memory, the flushing techniques and semantics described herein may similarly be used in ensuring that data are simply flushed to coherency, i.e., flushed from any intervening buffer, such as a cache, to a target memory, such as the host system memory, where it is ensured that the data are visible to other applications and devices running on the computer. The flush properties of any given memory region on a host computer (for example, whether a flush operation causes the data to be flushed to persistent memory or simply flushed to coherency) can be set locally on the host computer, depending upon application and system requirements. In this model, when a peer NIC directs an RDMA flush operation over a network to a certain memory region on the host computer, the semantics of the NIC operation are agnostic to the actual flush properties of the region.

Thus references to "persistent memory" in the description that follows should be understood more generally as examples of flushing to a target memory, whether persistent or not. By the same token, the term "buffer" should be taken to refer not only to a RAM buffer that is specifically associated with a target memory in a given memory device, but also to any sort of cache or other memory in which data may be held temporarily before flushing to a target memory. Some of the embodiments described hereinbelow make use of a "persistence flag," but this term, as well, should be understood as one example of a "flush flag," which is used to mark the data in a given transaction for immediate flushing, as described hereinbelow.

In the disclosed embodiments, a persistent memory device comprises a volatile buffer memory, which receives data written over a bus by a storage initiator for storage in specified addresses within the memory address space of a persistent memory. After writing the data to the bus, the initiator sends a flush instruction to the persistent memory device. This flush instruction may apply to all of the data conveyed over the bus to the memory device in write commands posted previously to the flush instruction, or it may indicate certain data in the buffer memory (but possibly not all the data) that should be flushed to the persistent memory. In response to this flush instruction, a memory controller in the persistent memory device immediately carries out the requested flush operation. If the flush instruction applies to a specific range in the memory address space, the data outside the range can be left in the buffer memory (at least temporarily) without immediate flushing to the persistent memory. After flushing the data to the persistent memory, the memory controller sends a completion message over the bus to the initiator.

When the flush instruction identifies a particular range within the memory address space, it causes the memory controller to flush the data held in the buffer memory with specified addresses within the identified range to the persistent memory. Typically, the bus address space in which the range to be flushed is identified in terms of memory pages, and the memory controller translates the identified range of memory pages for flushing from the bus address space to memory blocks in the memory address space. The memory controller in these embodiments comprises a logical component referred to herein as a "persistency agent," implemented in hardware logic and/or software, which is responsible for management, address translation, and messaging in connection with flushing of data to the persistent memory.

In other embodiments, the storage initiator writes data over the bus to the persistent memory device in transaction packets comprising a transaction descriptor that includes a persistence flag, i.e., one or more bits in the descriptor that can be set by the initiator to mark the data for immediate flushing from the buffer to persistent memory. The initiator then sends a flush instruction over the bus, which causes the memory controller to immediately flush to the persistent memory the data held in the buffer memory for which the persistence flag was set in the transaction packets that conveyed the data to the memory device.

Figure 1:
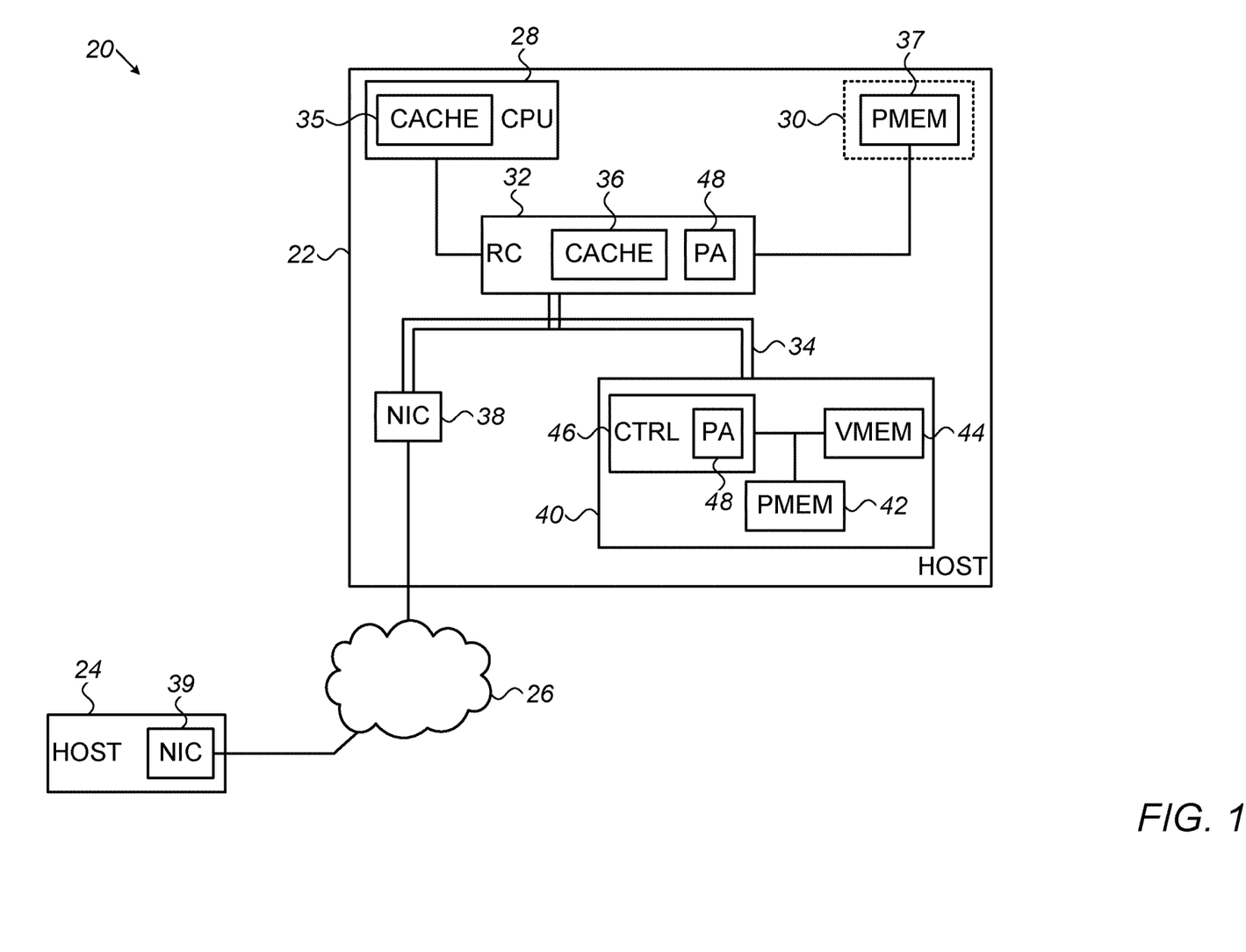
FIG. 1 is a block diagram that schematically illustrates a computer system, in accordance with an embodiment of the invention.

FIG. 1 is a block diagram that schematically illustrates a computer system 20, in accordance with an embodiment of the invention. System 20 comprises computers 22 and 24, which are connected as nodes of a network 26. For the sake of simplicity, only two computers 22 and 24 are shown in FIG. 1, and only the components of computer 22 are shown in detail. In practice, system 20 typically comprises a large number of computers, each of which may be constructed and operate in a manner similar to computer 22. Network 26 is a packet data network, such as a suitable InfiniBand or Ethernet network, which is capable of RDMA transport.

Computer 22 comprises a CPU 28 and a system memory 30. A root complex 32 serves as the memory controller for memory 30 and also couples CPU 28 and memory 30 to a peripheral component bus 34, such as a PCIe bus. Memory 30 typically comprises one or more integrated circuit chips in a DIMM package, including a persistent memory (PMEM) 37. CPU 28 and root complex 32 comprise respective memory caches 35 and 36, which serve as buffers for data that are to be stored in specified addresses within the address space of memory 30.

Computer 22 is connected to network 26 by a NIC 38, which communicates with NICs of peer nodes, including a NIC 39 of computer 24. NIC 38 and NIC 39 exchange RDMA requests and responses over transport service instances established between the NICs. In the context of InfiniBand and some other RDMA protocols, the transport service instances take the form of queue pairs (QPs), which enable software processes running on computer 22 to exchange data and instructions with processes on computer 24.

Computer 22 also comprises a persistent memory device 40, which is connected to bus 34. Device 40 comprises one or more memory chips, including a persistent memory 42 and a volatile buffer memory (VMEM) 44, which typically comprises RAM. A memory controller 46 receives and transmits data and instructions over bus 34 and controls the operation of persistent memory 42 and buffer memory 44, including specifically flushing of data from the buffer memory to the persistent memory. In the pictured embodiment, in which bus 34 is configured as a PCIe bus, these data and instructions are conveyed over bus 34 in the form of transaction level packets (TLPs). Such packets are also referred to simply as transaction packets.

Device 40 exposes a memory address space on bus 34, enabling other entities, including both software processes and hardware components, such as NIC 38, to read from and write to specified addresses in the address space via the bus. In some embodiments, device 40 uses internal addresses to store and receive data in persistent memory 42 that are different from the addresses in the bus address space that are used in these read and write operations. In some such cases, controller 46 maintains address translation tables and logic for translating between the bus and internal address spaces. A scheme for using and maintaining such tables is described, for example, in U.S. patent application Ser. No. 14/953,462, filed Nov. 30, 2015, which is assigned to the assignee of the present patent application and whose disclosure is incorporated herein by reference. Typically, the functions of controller 46 include translating between the granularity of data transactions on bus 34, which are typically expressed in pages (for example, units of 4 KB as are used in the PCIe standard), and the granularity of data blocks stored in persistent memory 42, which may be larger or smaller.

In some embodiments, as described further hereinbelow, controller 46 includes a persistency agent (PA) 48, which handles messaging and execution of commands relating to flushing of data from buffer memory 44 to persistent memory 42. PA 48 may be implemented in hardware logic or in software or firmware on a suitable embedded processor, as a part of the logic and processing components of controller 46. Root complex 32, which serves as the controller for system memory 30, typically comprises a similar PA 48, as may NIC 38 and other components on bus 34.

PA 48 provides a messaging interface, which enables entities on bus 34, such as NIC 38, to pass flush instructions to persistent memory device 40. These instructions may refer to all previously posted writes on bus 34, or they may identify a range within the memory address space of device 40 that is to be flushed to persistent memory 42. As noted earlier, the range to be flushed is typically specified in terms of pages in the bus address space of bus 34, and PA 48 translates the range into memory blocks for flushing within the memory address space of device 40. For efficient and reliable message flow control, PA 48 may issue persistence credits to NIC 38 and other bus entities, which are consumed when a flush instruction is submitted. After flushing the data in the specified range to persistent memory 42, PA 48 sends a completion message over bus 34 to the sender of the flush instruction and issues additional credits for subsequent use.

Alternatively or in addition to the persistence messaging interface provided by PA 48, a bit or bits within the header of TLPs conveyed over bus 34, for example one or more bits in the transaction descriptor field of the header, may be defined as a persistence flag. In the *PCI Express Base Specification* (Rev. 3.0, published by PCI-SIG, Nov. 10, 2010), the transaction descriptor is defined in section 2.2.6 as a part of the TLP header that is used for carrying transaction information between a requester and a completer on the bus. The "attributes" field of the transaction descriptor includes four bits, one of which can be set to mark the data in a given TLP as requiring persistent storage. The "No Snoop" attribute field, defined in section 2.2.6.5, can be used for this purpose, for example, as long as the entities on bus 34 are programmed to recognize it as such. This approach is advantageous in that it takes advantage of existing bus protocol features, rather than requiring a new messaging interface to be defined.

Thus, when NIC 38 (or another entity on bus 34) conveys data over bus 34 in a write TLP addressed to memory device 40, the NIC can set the persistence flag in the TLP descriptor to mark the data for persistence. Controller 46 in memory device 40 tracks the address ranges in buffer 44 in which such marked data are held. After posting the write operation, NIC 38 sends a flush instruction over bus 34 to device 40, for example, a zero-length read with the same persistence flag set. Controller 46 recognizes this flush instruction and immediately flushes to persistent memory 42 all of the marked data held in buffer memory 44. After flushing the marked data to persistent memory 42, controller 46 sends a completion message over bus 34, such as a response to the zero-length read, addressed to the initiator of the flush instruction.

Figure 2:
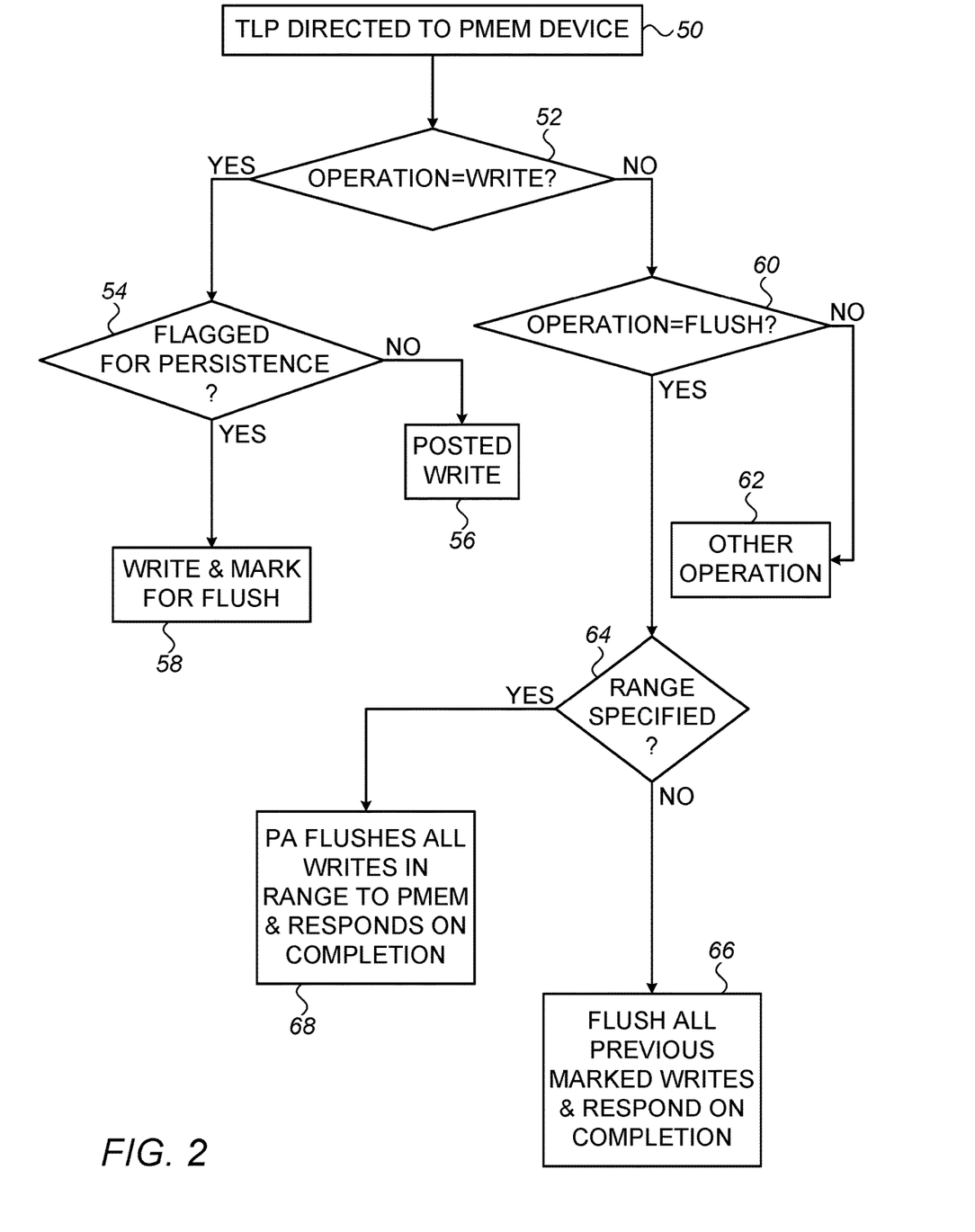
FIG. 2 is a flow chart that schematically illustrates a method for controlling a persistent memory device, in accordance with an embodiment of the invention.

FIG. 2 is a flow chart that schematically illustrates a method for controlling persistent memory device 40, in accordance with an embodiment of the invention. For the sake of completeness, this method combines the features of both of the persistence-control protocols described above: the messaging interface between persistence agents 48 and marking of transaction packets for persistence. Alternatively, either of these protocols can be used alone in computer 22, independently of the other protocol. Furthermore, although this method is described, for the sake of clarity and convenience, with reference specifically to device 40, it may alternatively be applied in writing persistent data to system memory 30, as well as other bus-connected persistent memory components.

The method of FIG. 2 is initiated when device 40 receives a TLP over bus 34, at a TLP reception step 50. Controller 46 reads the TLP header in order to ascertain the type of operation requested, at a parsing step 52. When the TLP is a write packet, controller 46 checks the transaction descriptor to determine whether the persistence flag is set, at a persistence checking step 54. If not, memory device 40 handles the TLP as an ordinary, posted write of the data contained in the TLP payload, at a posted writing step 56. In this case, the data may be written to buffer memory 44 and then flushed to persistent memory 42 according to priorities set by controller 46, without any guarantee of immediate flushing or persistence in case of failure. If the persistence flag is set, and the data are written to buffer memory 44, controller 46 marks the data for flushing, at a persistent writing step 58.

On the other hand, when the TLP received at step 50 is found at step 52 to be other than a write packet, controller 46 checks the TLP to determine whether it contains a flush instruction, at a flush checking step 60. If not, controller 46 continues with the appropriate operation indicated by the TLP, such as a data read operation, at a non-flush operation step 62. Otherwise, the controller will proceed to flush data from buffer memory 44 to persistent memory 42 in accordance with the flush instruction.

As noted earlier, embodiments of the present invention provide two complementary types of flush operations: a flush message to PA 48, which specifies a memory range to be flushed to persistent memory 42, and a flush TLP, such as a zero-length read, which indicates that all data previously marked for persistence should be flushed to the persistent memory. Controller 46 checks which of these two types of operations is called for, at a flush type checking step 64. If the TLP received at step 50 is a flush TLP, with the persistence flag set, controller 46 identifies all of the marked data currently held in buffer memory 44, i.e., the data that arrived in write TLPs with the persistence flag set, and flushes these data to persistent memory 42, at a flagged flushing step 66. Controller 46 then responds to NIC 38 with a TLP indicating that the marked data have been flushed and are now stored in persistent memory 42.

Alternatively, if the TLP received at step 50 contains a message specified a range of memory to flush, PA 48 flushes all data in the specified range to persistent memory 42 (whether or not the data are marked), at a range flushing step 68. PA 48 then sends a completion message to NIC 38, reporting that the data in the specified range are now stored in persistent memory 42.

The techniques described above can be used in implementing RDMA persistent write semantics. Such semantics allow a NIC in a peer node on network 26, such as NIC 39 of computer 24, to write data to a memory on computer 22, such as device 40 or system memory 30, and receive a completion report indicating that the data have actually been flushed to persistent memory 42 or 37. To enable entities on computer 22 to invoke these sorts of operations, new RDMA verbs can be defined: RDMA flush, and possibly RDMA persistent write. These verbs are used by software processes running on computer 22 in submitting work requests to NIC 39, which cause NIC 39 to transmit corresponding RDMA write and RDMA flush packets over network 26 to NIC 38. (This latter packet type is referred to herein as "RDMA flush" because of its association with RDMA write operations, but it could actually be transmitted as a SEND packet with the flush control description in the payload.)

For example, NIC 39 may transmit over network 26 one or more RDMA write packets containing the data to be written to memory device 40 and specifying the addresses to which the data are to be written. NIC 39 then transmits an RDMA flush packet, either indicating that all previously-posted writes are to be flushed to persistent memory 42, or identifying a range of addresses in memory device 40 that are to be flushed to persistent memory 42. Upon receiving the RDMA write packet, NIC 38 sends one or more corresponding write TLPs over bus 34 to device 40, which may place the data temporarily in buffer memory 44. Then, in response to the RDMA flush packet, NIC 38 sends a flush message over bus 34 to PA 48, which flushes the appropriate data from buffer memory 44 to persistent memory 42. Typically, the data and the flush instruction are conveyed from NIC 38 to memory device 40, and the data are flushed by memory controller 46 from buffer memory 44 to persistent memory 42, without generating an interrupt to CPU 28.

There are various ways in which the RDMA flush packet can identify a range of addresses to be flushed. For example, the flush work request on computer 24 may include a list of address entries that are to be flushed to persistence, and this list is then included (following any required address translation) in the corresponding RDMA flush packet that is transmitted by NIC 39 and in the flush message sent by NIC 38 to memory device 40. Additionally or alternatively, the range of addresses to be flushed may be identified in terms of the QP used by NIC 39 and NIC 38 in transmitting and receiving the RDMA packets in question. For example, an RDMA flush packet received on a given QP may cause NIC 38 to instruct PA 48 to flush all data that were received over that QP, or all data received on the given QP in a particular memory region that is associated with the QP.

In this regard, memory controller 46 typically identifies multiple regions within the memory address space of device 40. Each such region can be associated with a given QP and has attributes that are indicated by a corresponding memory key (MKEY), which is used by elements of computer 22, including NIC 38, in accessing the memory region. Root complex 32, in its role as memory controller for system memory 30, may identify similar sorts of regions and attributes in the system memory. In some embodiments, the attributes of each memory region include flush attributes, which indicate to the appropriate memory controller how to handle flush commands with respect to the region. For example, the flush attributes may indicate whether a given region corresponds to a range that comprises persistent memory, so that the corresponding data are flushed to persistence, or whether the region is to be flushed only for coherence, rather than persistence. The flush attributes for each memory region can be set by software running on CPU 28, and thus determine how the memory controller will treat the data in each such region upon receiving a flush command.

Alternatively, NIC 39 may transmit one or more RDMA write packets containing the data to be written to memory device 40, wherein the packets specify the addresses in device 40 to which the data are to be written and indicate that the data are to be flushed to the persistent memory. Upon receiving these RDMA write packets, NIC 38 sends one or more corresponding TLPs over bus 34 to device 40 with the persistence flag set in the TLP descriptors. NIC 39 then sends an RDMA flush packet, which causes NIC 38 to send a flush TLP to memory device 40, for example a zero-length read TLP with the persistence flag set. In response to these TLPs, controller 46 will receive and flush the data to persistent memory 42, as described above. In this case, too, the data and the flush instruction are conveyed from NIC 38 to memory device 40, and the data are flushed by controller 46 from buffer memory 44 to persistent memory 42, without generating an interrupt to CPU 28.

In any case (whether all data, or a specified range, or all marked data are to be flushed), once all the required data have been successfully flushed to persistent memory 42, controller 46 will report over bus 34 to NIC 38 that the flush operation has been completed. In response to this report, NIC 38 will send an acknowledgment packet over network 26 back to NIC 39, which will then post a completion report (typically in the form of a completion queue element [CQE]). Once the process on computer 24 that initiated the data transfer receives the completion report, it can consider the data to have been stored in persistent memory with full confidence.

Figure 3:
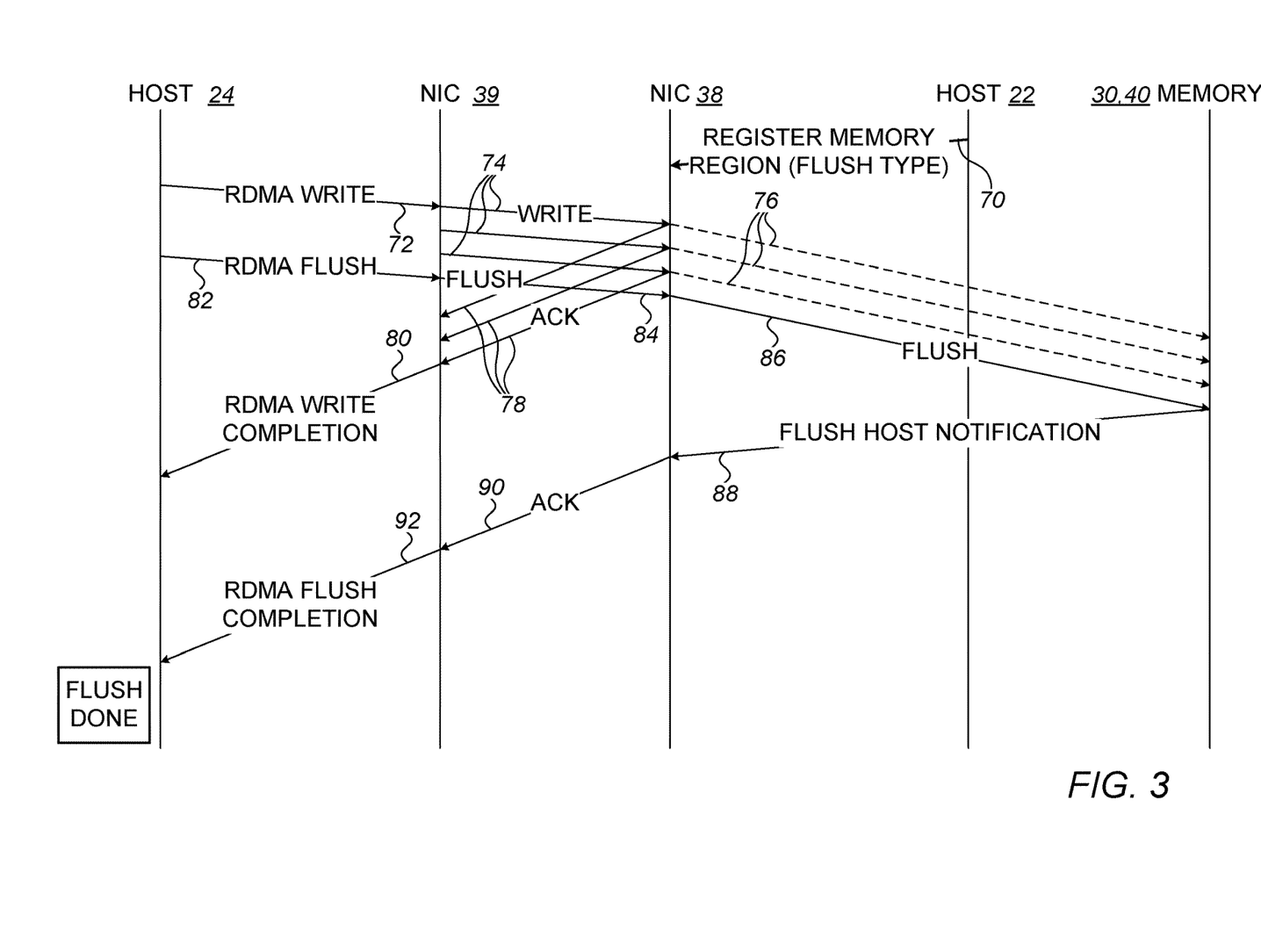
FIG. 3 is a ladder diagram that schematically illustrates a method for remote flushing of data written to a memory device, in accordance with an embodiment of the invention.

FIG. 3 is a ladder diagram that schematically illustrates an example implementation of the above techniques for remote flushing of data written to a memory device, in accordance with an embodiment of the invention. For the sake of concreteness and clarity, the components involved in the operations in FIG. 3 are taken to be those that are shown in FIG. 1, as described hereinabove. Alternatively, however, the flow of communications and operations illustrated in FIG. 3 may be implemented in other sorts of system architectures that are known in the art.

As a preliminary step, CPU 28 of host computer 22 registers one or more memory regions in the target memory, by sending a registration instructions 70 to NIC 38. The registration instructions include flush attributes, indicating how flush instructions are to be handled in each memory region.

The CPU of host computer 24 submits an RDMA write work request 72, which causes NIC 39 to transmit one or more RDMA write packets 74 over network 26 to NIC 38, containing the data indicated in work request 72. Upon receiving packets 74 on a given QP, NIC 38 uses the memory key of the corresponding memory region, as indicated by registration instructions 70, to write the data over bus 34 to the specified addresses in system memory 30 or device 40, in one or more bus transactions 76. NIC 38 returns one or more RDMA write acknowledgments 78 to NIC 39. Upon receiving acknowledgment of all of RDMA write packets 74, NIC 39 issues a write completion report 80 (such as a CQE) to the CPU of host computer 24.

Following RDMA write work request 72, the CPU of host computer 24 submits an RDMA flush work request 82 to NIC 39, causing NIC 39 to transmit an RDMA flush packet 84 to NIC 38. Because the nature of the flush operation to be performed on each memory region in computer 22 is determined by the respective flush attributes indicated by registration instructions 70, the semantics of work request 82 and packet 84 are agnostic to the specific sort of flush that is to be performed (for example, whether data are to be flushed to persistence or to coherence, as explained above). Upon receiving RDMA flush packet 84, NIC 38 initiates a flush transaction 86 over bus 34, directed to the memory region in question.

In response to flush transaction 86, the memory controller (such as controller 46 or root complex 32) carries out the appropriate flush operation, flushing buffered data to persistent memory 42 or 37, for example. Upon completion of the flush, the memory controller returns a flush notification 88 over bus 34 to NIC 38, indicating that the data have been flushed as required. NIC 38 then returns a flush acknowledgment 90 to NIC 39, which then issues a flush completion report 92 to the CPU of host computer 24. At this point, the host process that initiated the interchange shown in FIG. 3 is assured that the data in question have all been successfully written and flushed as required.

It will be appreciated that the embodiments described above are cited by way of example, and that the present invention is not limited to what has been particularly shown and described hereinabove. Rather, the scope of the present invention includes both combinations and subcombinations of the various features described hereinabove, as well as variations and modifications thereof which would occur to persons skilled in the art upon reading the foregoing description and which are not disclosed in the prior art.

The invention claimed is:

1. Computing apparatus, comprising:
   a memory device, comprising:
   a target memory, having a memory address space;
   a volatile buffer memory, which is coupled to receive data written over a bus to the memory device for storage in specified addresses within the memory address space; and
   a memory controller, which is configured to receive, via the bus, a flush instruction and, in response to the flush instruction, to immediately flush the data held in the buffer memory with specified addresses within the memory address space to the target memory; and
   a network interface controller (NIC), which is coupled to receive from a peer node, via a network, a remote direct memory access (RDMA) write packet containing the data to be written to the memory device and specifying the addresses to which the data are to be written, and to receive an RDMA flush packet, and which is configured, in response to the RDMA write and flush packets, to convey the data and the flush instruction over the bus to the memory device, without generating an interrupt to a central processing unit (CPU) that is coupled to the bus in the apparatus.

2. The apparatus according to claim 1, wherein the target memory comprises a persistent memory.

3. The apparatus according to claim 1, wherein the flush instruction causes the memory controller to flush to the target memory all of the data conveyed over the bus to the target memory in write commands posted previously to the flush instruction.

4. The apparatus according to claim 1, wherein the flush instruction identifies a range that is to be flushed within the memory address space, and causes the memory controller to immediately flush the data held in the buffer memory with specified addresses within the identified range to the target memory.

5. The apparatus according to claim 4, wherein the memory controller is configured to flush, in response to the flush instruction, the data only within the identified range, while leaving further data with specified addresses outside the identified range in the buffer memory without immediate flushing to the target memory.

6. The apparatus according to claim 1, wherein the memory controller is configured, after flushing the data to the target memory, to send a completion message over the bus to a sender of the flush instruction.

7. The apparatus according to claim 1, wherein the bus over which the data and flush instruction are written is a peripheral component bus of a computer, having a bus address space in which a range to be flushed is identified in terms of memory pages, and wherein the memory controller is configured to translate the identified range of memory pages from the bus address space to memory blocks for flushing within the memory address space.

8. The apparatus according to claim 1, wherein the memory controller is configured to identify multiple regions within the memory address space and to associate respective flush attributes with the regions, wherein the flush instruction causes the memory controller to flush the data held in the buffer memory with specified addresses within any given region in accordance with the respective flush attributes.

9. The apparatus according to claim 8, wherein the respective flush attributes indicate whether the given region corresponds to a range in the target memory that comprises persistent memory.

10. The apparatus according to claim 1, wherein the NIC is configured to receive the RDMA write and flush packets from the peer node over a transport service instance established between the NIC and the peer node, wherein a memory region in the memory device is associated with the transport service instance, wherein the write packet causes the NIC to write the data to the associated memory region, and wherein the flush packet causes the NIC to issue the flush instruction with respect to the associated memory region.

11. The apparatus according to claim 10, wherein the NIC is configured to associate respective flush attributes with the memory region, and wherein the flush instruction causes the memory controller to flush the data written by the NIC to specified addresses within the memory region in accordance with the associated flush attributes.

12. The apparatus according to claim 1, and comprising a peer NIC deployed at the peer node, wherein the peer NIC is configured to transmit the RDMA write and flush packets over the network in response to RDMA write and flush work requests submitted to the peer NIC by a process running on the peer node.

13. A memory device, comprising:
    a target memory, having a memory address space;
    a volatile buffer memory, which is coupled to receive data written over a bus in transaction packets sent from another device on the bus to the memory device for storage in specified addresses within the memory address space, each transaction packet comprising a header, which comprises a transaction descriptor, which comprises a flush flag, and a payload comprising the data; and
    a memory controller, which is configured to receive, via the bus, a flush instruction and, in response to the flush instruction, to immediately flush to the target memory the data held in the buffer memory for which the flush flag was set in the transaction packets that conveyed the data to the memory device.

14. The device according to claim 13, wherein the target memory comprises a persistent memory.

15. The device according to claim 13, wherein the memory controller is configured to flush, in response to the flush instruction, only the data for which the flush flag was set, while leaving further data that arrived in transaction packets in which the flush flag was not set in the buffer memory without immediate flushing to the target memory.

16. The device according to claim 13, wherein the memory controller is configured, after flushing the data to the target memory, to send a completion message over the bus to a sender of the flush instruction.

17. The device according to claim 13, wherein the transaction descriptor comprises a "No Snoop" attribute field, which comprises the flush flag.

18. Computing apparatus, comprising:
    the memory device according to claim 13; and a network interface controller (NIC), which is coupled to receive, via a network, a remote direct memory access (RDMA) write packet containing the data to be written to the memory device, specifying the addresses to which the data are to be written, and indicating that the data are to be flushed to the target memory, and to receive an RDMA flush packet following the RDMA write packet, and which is configured, in response to the RDMA write packet, to convey the data over the bus to the memory device in a transaction packet in which the flush flag is set, and to convey the flush instruction to the memory device in response to the RDMA flush packet.

19. The apparatus according to claim 18, wherein the data and the flush instruction are conveyed from the NIC to the memory device, and the data are flushed by the memory controller from the buffer memory to the persistent memory without generating an interrupt to a central processing unit (CPU) that is coupled to the bus in the apparatus.

20. The apparatus according to claim 18, wherein the NIC is configured to receive the RDMA write and flush packets from the peer node over a transport service instance established between the NIC and the peer node, wherein a memory region in the memory device is associated with the transport service instance, wherein the write packet causes the NIC to write the data to the associated memory region, and wherein the flush packet causes the NIC to issue the flush instruction with respect to the associated memory region.

21. The apparatus according to claim 20, wherein the NIC is configured to associate respective flush attributes with the memory region, and wherein the flush instruction causes the memory controller to flush the data written by the NIC to specified addresses within the memory region in accordance with the associated flush attributes.

22. The apparatus according to claim 18, and comprising a peer NIC deployed at the peer node, wherein the peer NIC is configured to transmit the RDMA write and flush packets over the network in response to RDMA write and flush work requests submitted to the peer NIC by a process running on the peer node.

23. A method for data storage in a memory device that includes a target memory and a volatile buffer memory, the method comprising:
receiving in a network interface controller (NIC) coupled to a bus, from a peer node via a network, a remote direct memory access (RDMA) write packet containing data to be written to the memory device and specifying addresses to which the data are to be written within a memory address space of the memory device;
conveying the data over the bus from the NIC to the memory device;
receiving in the volatile buffer memory the data written over a bus to the memory device for storage in the specified addresses within the memory address space of the memory device;
receiving in the NIC over the network an RDMA flush packet;
in response to the RDMA flush packet, conveying the flush instruction from the NIC over the bus to the memory device; and
in response to the flush instruction, immediately flushing the data held in the buffer memory with specified addresses within the memory address space to the target memory,
wherein the data and the flush instruction are conveyed from the NIC to the memory device, and the data are flushed from the buffer memory to the target memory without generating an interrupt to a central processing unit (CPU) that is coupled to the bus.

24. The method according to claim 23, wherein the target memory comprises a persistent memory.

25. The method according to claim 23, wherein flushing the data comprises immediately flushing to the target memory all of the data conveyed over the bus to the target memory in write commands posted previously to the flush instruction.

26. The method according to claim 23, wherein the flush instruction identifies a range that is to be flushed within the memory address space, and wherein flushing the data comprises immediately flushing the data held in the buffer memory with specified addresses within the identified range to the target memory.

27. The method according to claim 26, wherein flushing the data comprises flushing, in response to the flush instruction, the data only within the identified range, while leaving further data with specified addresses outside the identified range in the buffer memory without immediate flushing to the target memory.

28. The method according to claim 23, and comprising, after flushing the data to the target memory, sending a completion message over the bus to a sender of the flush instruction.

29. The method according to claim 23, wherein the bus over which the data and flush instruction are written is a peripheral component bus of a computer, having a bus address space in which a range to be flushed is identified in terms of memory pages, and wherein flushing the data comprises translating the identified range of memory pages from the bus address space to memory blocks for flushing within the memory address space.

30. The method according to claim 23, and comprising associating respective flush attributes with multiple regions within the memory address space, wherein flushing the data comprises applying the flush instruction to the data held in the buffer memory with specified addresses within any given region in accordance with the respective flush attributes.

31. The method according to claim 30, wherein the respective flush attributes indicate whether the given region corresponds to a range in the target memory that comprises persistent memory.

32. The method according to claim 23, wherein the RDMA write and flush packets are received from the peer node over a transport service instance established between the NIC and the peer node, wherein a memory region in the memory device is associated with the transport service instance, wherein the write packet causes the NIC to write the data to the associated memory region, and wherein the flush packet causes the NIC to issue the flush instruction with respect to the associated memory region.

33. The method according to claim 32, and comprising associating respective flush attributes with the memory region, wherein flushing the data comprises immediately flushing the data written by the NIC to specified addresses within the memory region in accordance with the associated flush attributes.

34. The method according to claim 23, and comprising transmitting the RDMA write and flush packets over the network in response to RDMA write and flush work requests submitted to a peer NIC at the peer node by a process running on the peer node.

35. A method for data storage in a memory device that includes a target memory and a volatile buffer memory, the method comprising:

receiving in the volatile buffer memory data written over a bus in transaction packets sent from another device on the bus to the memory device for storage in specified addresses within a memory address space of the memory device, each transaction packet comprising a header, which comprises a transaction descriptor, which comprises a flush flag, and a payload comprising the data;

receiving, via the bus, a flush instruction; and in response to the flush instruction, immediately flushing to the target memory the data held in the buffer memory for which the flush flag was set in the transaction packets that conveyed the data to the memory device.

36. The method according to claim 35, wherein the target memory comprises a persistent memory.

37. The method according to claim 35, wherein flushing the data comprises flushing, in response to the flush instruction, only the data for which the flush flag was set, while leaving further data that arrived in transaction packets in which the flush flag was not set in the buffer memory without immediate flushing to the target memory.

38. The method according to claim 35, and comprising, after flushing the data to the target memory, sending a completion message over the bus to a sender of the flush instruction.

39. The method according to claim 35, wherein the transaction descriptor comprises a "No Snoop" attribute field, which comprises the flush flag.

40. The method according to claim 35, wherein receiving the data comprises receiving in a network interface controller (NIC) coupled to the bus, from a peer node via a network, a remote direct memory access (RDMA) write packet containing the data to be written to the memory device and specifying the addresses to which the data are to be written and indicating that the data are to be flushed to the target memory, and conveying the data over the bus from the NIC to the memory device in a transaction packet in which the flush flag is set, and wherein receiving the flush instruction comprises receiving in the NIC over the network an RDMA flush packet following the RDMA write packet, and in response to the RDMA flush packet, conveying the flush instruction from the NIC over the bus to the memory device.

41. The method according to claim 40, wherein the data and the flush instruction are conveyed from the NIC to the memory device, and the data are flushed from the buffer memory to the persistent memory without generating an interrupt to a central processing unit (CPU) that is coupled to the bus.

42. The method according to claim 40, wherein the RDMA write and flush packets are received from the peer node over a transport service instance established between the NIC and the peer node, wherein a memory region in the memory device is associated with the transport service instance, wherein the write packet causes the NIC to write the data to the associated memory region, and wherein the flush packet causes the NIC to issue the flush instruction with respect to the associated memory region.

43. The method according to claim 42, and comprising associating respective flush attributes with the memory region, wherein flushing the data comprises immediately flushing the data written by the NIC to specified addresses within the memory region in accordance with the associated flush attributes.

44. The method according to claim 40, and comprising transmitting the RDMA write and flush packets over the network in response to RDMA write and flush work requests submitted to a peer NIC at the peer node by a process running on the peer node.

* * * * *